(12) United States Patent
Matsuoka et al.

(10) Patent No.: US 7,869,190 B2
(45) Date of Patent: Jan. 11, 2011

(54) SOLID ELECTROLYTIC CAPACITOR

(75) Inventors: Keiko Matsuoka, Osaka (JP); Kazuhiro Kato, Osaka (JP); Hiroyuki Okuda, Osaka (JP); Koso Ishihara, Mie (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 154 days.

(21) Appl. No.: 12/090,960

(22) PCT Filed: Oct. 20, 2006

(86) PCT No.: PCT/JP2006/320918

§ 371 (c)(1),
(2), (4) Date: Apr. 21, 2008

(87) PCT Pub. No.: WO2007/049509

PCT Pub. Date: May 3, 2007

(65) Prior Publication Data
US 2009/0122470 A1    May 14, 2009

(30) Foreign Application Priority Data
Oct. 24, 2005  (JP) .............................. 2005-308824
Oct. 24, 2005  (JP) .............................. 2005-309036

(51) Int. Cl.
H01G 9/00    (2006.01)
H01G 4/228   (2006.01)
H01G 9/04    (2006.01)
H01G 9/145   (2006.01)

(52) U.S. Cl. ...................................... 361/540; 361/528
(58) Field of Classification Search ................. 361/540, 361/533, 532, 528, 538, 523
See application file for complete search history.

(56) References Cited

U.S. PATENT DOCUMENTS 5,781,401 A * 7/1998 Tomiyasu et al. ........... 361/303

(Continued)

FOREIGN PATENT DOCUMENTS

JP    04369820 A * 12/1992

(Continued)

OTHER PUBLICATIONS

International Search Report of PCT/JP2006/320918, date of mailing Dec. 19, 2006.

(Continued)

*Primary Examiner*—Eric Thomas
*Assistant Examiner*—David M Sinclair
(74) *Attorney, Agent, or Firm*—Westerman, Hattori, Daniels & Adrian, LLP

(57) ABSTRACT

A solid electrolytic capacitor according to the present invention has: a capacitor element (30) having an anode terminal (31) protruding; a resin sheath (6) that covers the capacitor element (30); an anode lead frame (1) having an anode-side terminal surface (10) that is connected to a tip section of the anode terminal (31) of the capacitor element (30) and exposed from the resin sheath (6); and a cathode lead frame (2). The anode lead frame (1) includes, in a portion thereof embedded in the resin sheath (6), a spaced frame section (13) that extends along the anode terminal (31) at a distance from the anode terminal (31) and a bonding frame section (11) that protrudes from a center portion of the spaced frame section (13) to the anode terminal (31) and is bonded to the anode terminal (31).

17 Claims, 19 Drawing Sheets

U.S. PATENT DOCUMENTS

| | | | |
|---|---|---|---|
| 6,236,561 B1 * | 5/2001 | Ogino et al. | 361/523 |
| 6,430,034 B2 * | 8/2002 | Sano et al. | 361/528 |
| 6,616,713 B2 * | 9/2003 | Sano et al. | 29/25.03 |
| 6,665,172 B1 * | 12/2003 | Kim et al. | 361/523 |
| 6,751,086 B2 * | 6/2004 | Matsumoto | 361/523 |
| 6,891,716 B2 * | 5/2005 | Maier et al. | 361/523 |
| 6,903,921 B2 * | 6/2005 | Ishijima | 361/523 |
| 7,133,276 B2 * | 11/2006 | Fujii et al. | 361/523 |
| 7,136,276 B2 * | 11/2006 | Ishida et al. | 361/540 |
| 2005/0146842 A1 * | 7/2005 | Abe et al. | 361/523 |

FOREIGN PATENT DOCUMENTS

| | | | |
|---|---|---|---|
| JP | 05243100 A | * | 9/1993 |
| JP | 10-32144 A | | 2/1998 |
| JP | 2001-6978 A | | 1/2001 |
| JP | 3157722 B2 | | 4/2001 |
| JP | 2002-175952 A | | 6/2002 |
| JP | 2002-203747 A | | 7/2002 |

OTHER PUBLICATIONS

Chinese Office Action dated Jun. 4, 2010, issued in corresponding Chinese Patent Application No. 2006-80039362.5 (with partial translation).

Taiwanese Office Action dated Sep. 30, 2010, issued in corresponding Taiwanese Patent Application No. 095138955.

* cited by examiner

SOLID ELECTROLYTIC CAPACITOR

TECHNICAL FIELD

The present invention relates to a surface-mount solid electrolytic capacitor that has a capacitor element, and an anode terminal and a cathode terminal constituted by lead frames and connected to the capacitor element.

BACKGROUND ART

FIGS. 21 to 24 show a configuration of a known conventional solid electrolytic capacitor of the bottom-surface electrode type, which is suitable for surface mounting on a printed wiring board or the like (see Japanese Patent Laid-Open No. 2001-6978, for example). The solid electrolytic capacitor has a capacitor element formed by forming a dielectric coating film 4 on a surface of an anode body 3, which is a sintered body of a valve metal (tantalum, niobium, titanium, aluminum or the like), by oxidizing the surface of the anode body 3, forming a solid electrolyte layer 5a made of a conductive inorganic material, such as manganese dioxide, or a conductive organic material, such as TCNQ complex salt and conductive polymer, on the dielectric coating film 4, and then forming a cathode lead layer 5b made of a conductive carbon, silver or the like, on the solid electrolyte layer 5a (the solid electrolyte layer and the cathode lead layer will be collectively referred to as cathode layer 5 hereinafter).

An anode lead frame 9 is connected to an anode terminal 31 protruding from the anode body 3 via an anode link member 91, a cathode lead frame 8 is connected to the cathode lead layer 5b via a cathode bonding member 29, and the whole of the capacitor element is covered with a resin sheath 6 of epoxy resin or the like. The anode lead frame 9 and the cathode lead frame 8 have an anode-side terminal surface 10 and a cathode-side terminal surface 20 exposed on the back surface of the resin sheath 6, respectively.

To be more specific about the configuration of such a solid electrolytic capacitor, the anode body 3 is constituted by a sintered body of tantalum powder, the anode terminal 31 and the anode link member 91 are constituted by tantalum wires, and the anode lead frame 9 is constituted by a flat plate made of an alloy mainly containing iron and nickel. The anode link member 91 is mounted on the flat plate constituting the anode lead frame 9 and resistance-welded thereto, and the anode terminal 31 is disposed on the anode link member 91 in a posture that the anode terminal 31 intersects with the anode link member 91 and resistance-welded thereto.

However, the conventional solid electrolytic capacitor described above needs the anode link member 91 to connect the anode terminal 31 and the anode lead frame 9 to each other; the anode link member 91 is a considerably small, thin and short wire. Therefore, the anode link member 91 is difficult to mount on and weld to the anode lead frame 9, and there is a problem of poor workability.

Thus, an object of the present invention is to provide a solid electrolytic capacitor in which an anode lead frame and a cathode lead frame are exposed from a back surface of a resin sheath to form an anode-side terminal surface and a cathode-side terminal surface as described above, and an anode terminal and the anode lead frame are connected to each other without an anode link member.

DISCLOSURE OF THE INVENTION

A solid electrolytic capacitor according to the present invention comprises: a capacitor element formed by forming a dielectric coating film on a surface of an anode body having an anode terminal protruding therefrom and forming a cathode layer on the dielectric coating film; a resin sheath that covers the capacitor element; an anode lead frame having an anode-side terminal surface that is connected to a tip section of the anode terminal of the capacitor element and exposed from the resin sheath; and a cathode lead frame having a cathode-side terminal surface that is connected to the cathode layer and exposed from the resin sheath.

The anode lead frame includes, in a portion thereof embedded in the resin sheath, a spaced frame section that extends along the anode terminal at a distance from the anode terminal and a bonding frame section that protrudes from a center portion of the spaced frame section to the anode terminal and is bonded to the anode terminal.

Specifically, the entire length of the anode lead frame is embedded in the resin sheath, and a back surface of the spaced frame section is exposed on a back surface of the resin sheath to form the anode-side terminal surface.

Alternatively, the anode lead frame is composed of an embedded frame part embedded in the resin sheath and an exposed frame part extending along a side surface and the back surface of the resin sheath, the spaced frame section and the bonding frame section are formed in the embedded frame part, and the anode-side terminal surface is formed on a tip section of the exposed frame part.

In a specific configuration, the anode lead frame has flat sections that are formed at the opposite ends of the bonding frame section in the width direction of the anode lead frame perpendicular to the longitudinal direction thereof and extend in the same plane as the spaced frame section.

In another specific configuration, a recess for positioning of the anode terminal is formed in a surface of the bonding frame section of the anode lead frame by recessing a middle portion of the surface with respect to the opposite ends thereof in the direction perpendicular to the longitudinal direction of the anode terminal.

In the configurations according to the present invention described above, since the anode terminal of the anode body is directly bonded to the bonding frame section of the anode terminal, the anode link member conventionally used is not necessary, and the workability of the step of connecting the anode terminal to an anode lead member is improved. In addition, by forming the bonding frame section of the anode terminal into the shape of a bottom-closed tube by deep drawing, a problem of a molding error, such as a springback, is solved. In addition, since the bonding frame section has a recess that opens at a back surface of the solid electrolytic capacitor, when the solid electrolytic capacitor is surface-mounted on a printed wiring board or the like by reflow soldering, a so-called fillet is formed at the inner peripheral edge of the recess, and the mounting strength increases.

BEST MODE FOR CARRYING OUT THE INVENTION

First Embodiment

Figure 1:
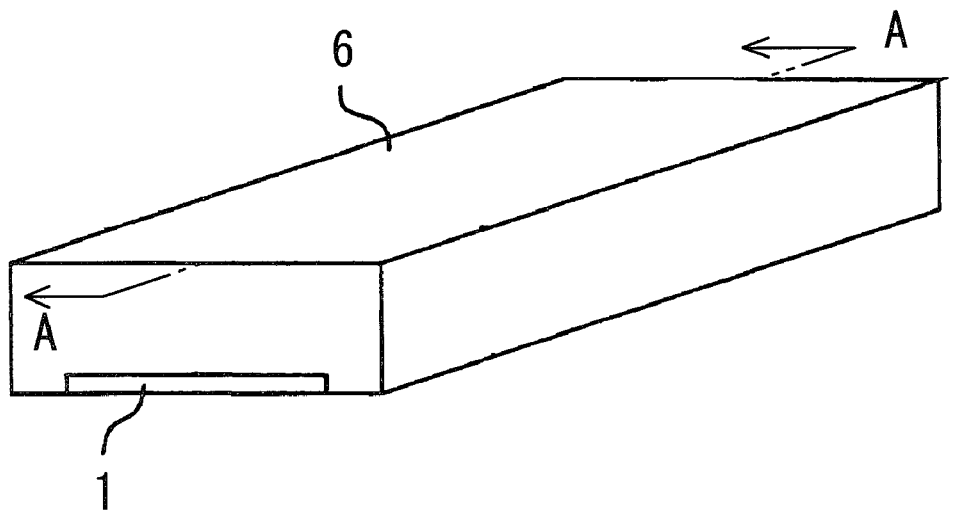
FIG. 1 is a perspective view of a solid electrolytic capacitor according to a first embodiment of the present invention.
Figure 2:
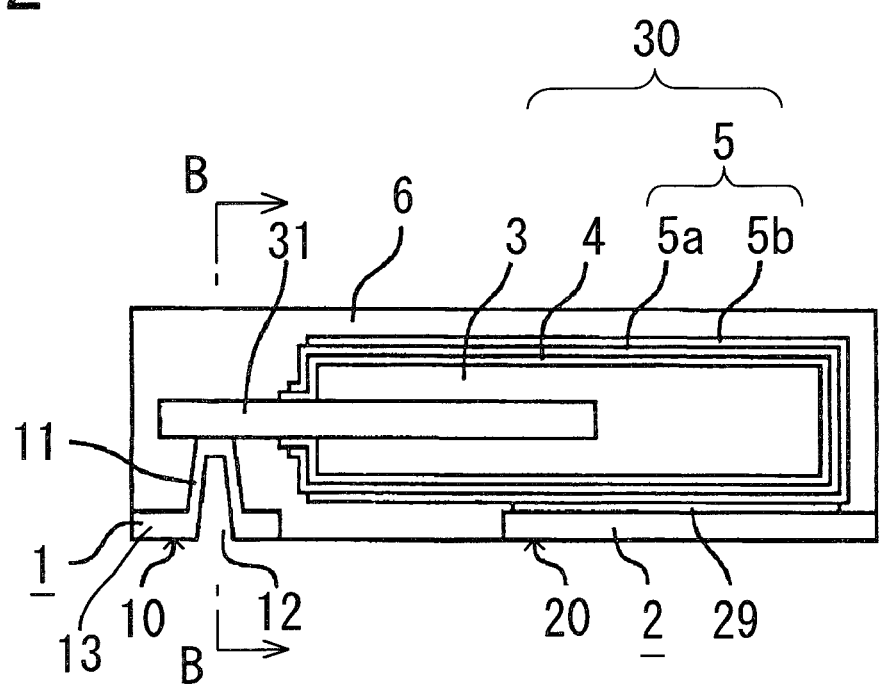
FIG. 2 is a cross-sectional view taken along the line A-A in FIG. 1.
Figure 3:
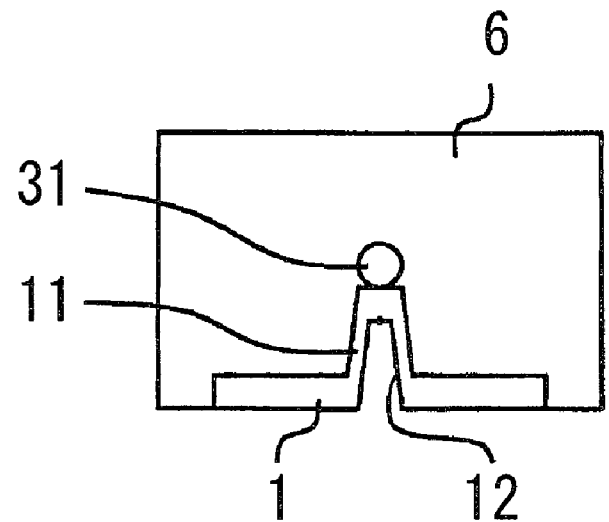
FIG. 3 is a cross-sectional view taken along the line B-B in FIG. 2.
Figure 4:
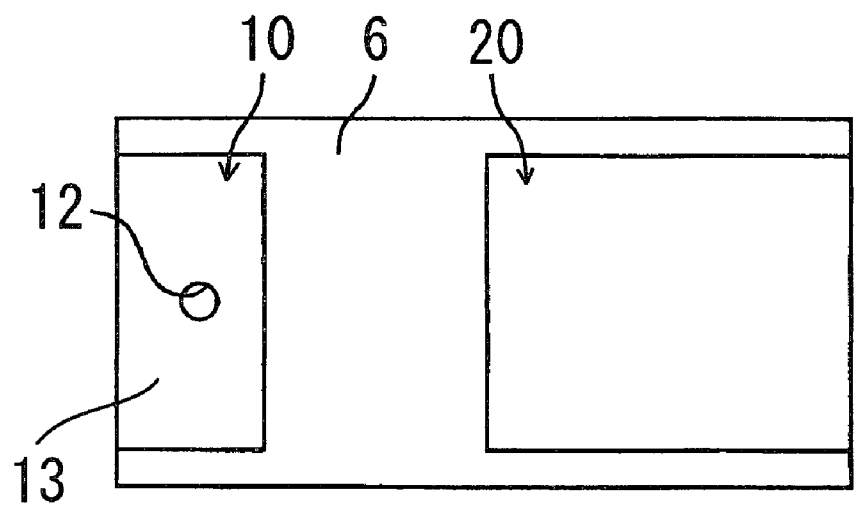
FIG. 4 is a rear view of the solid electrolytic capacitor.
Figure 5:
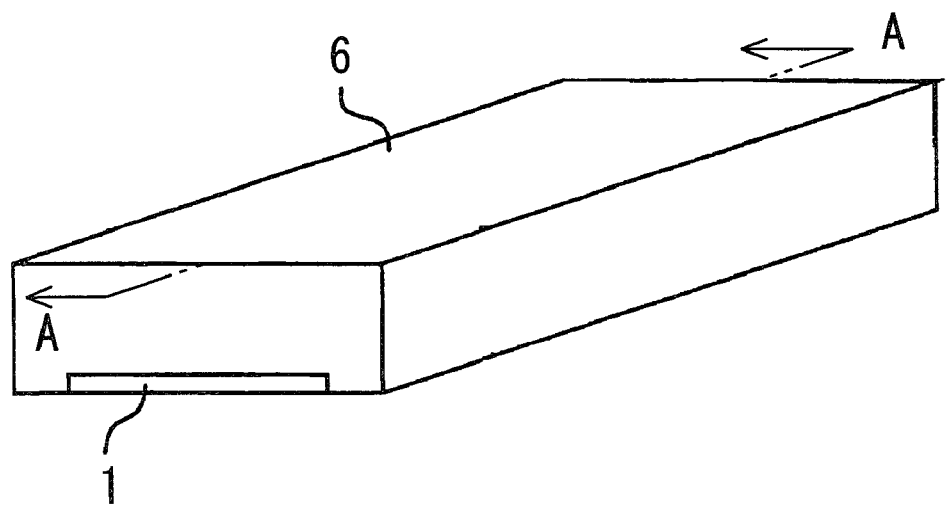
FIG. 5 is a perspective view of a solid electrolytic capacitor according to a second embodiment of the present invention.
Figure 6:
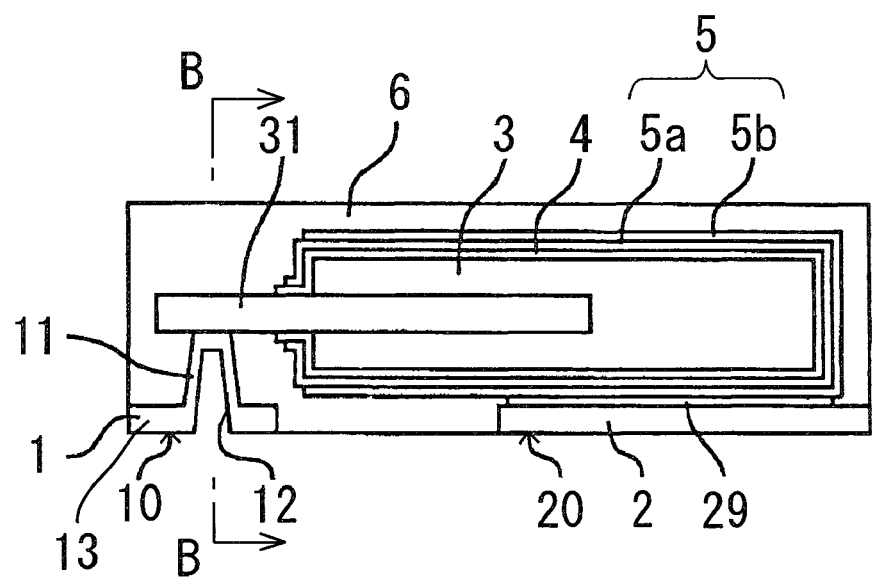
FIG. 6 is a cross-sectional view taken along the line A-A in FIG. 5.
Figure 7:
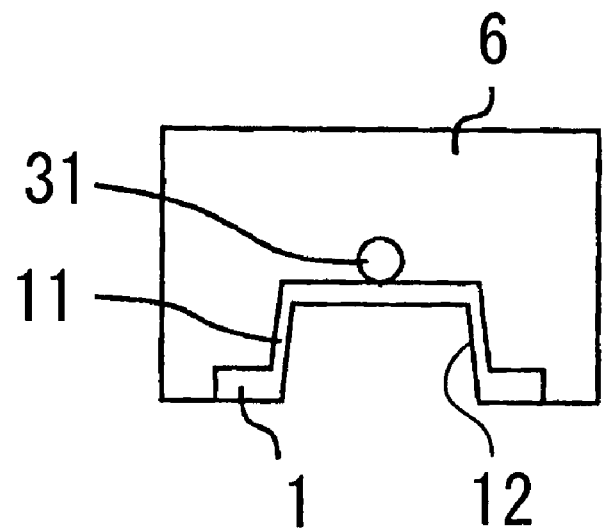
FIG. 7 is a cross-sectional view taken along the line B-B in FIG. 6.
Figure 8:
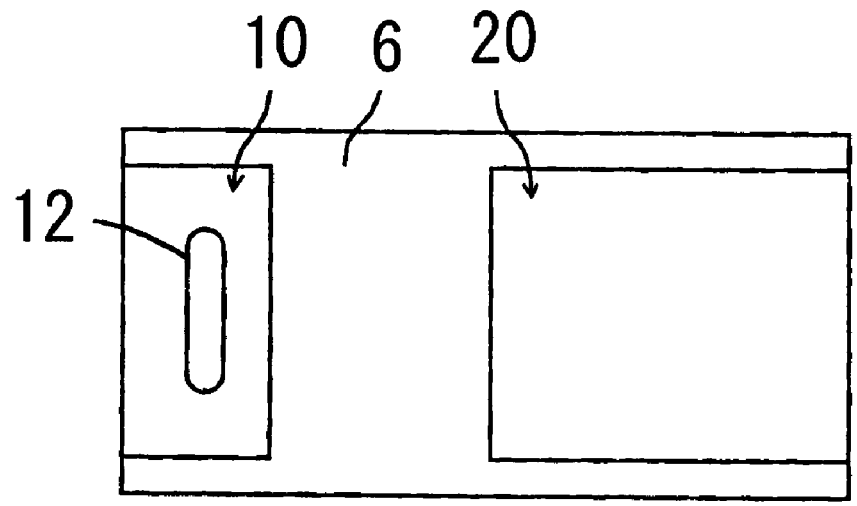
FIG. 8 is a rear view of the solid electrolytic capacitor.

FIGS. 1 to 4 show a solid electrolytic capacitor according to a first embodiment of the present invention. The solid electrolytic capacitor has a capacitor element 30 formed by forming a dielectric coating film layer 4 on a surface of an anode body 3, which is a sintered body of a valve metal (tantalum, niobium, titanium, aluminum or the like), by oxidizing the surface of the anode body 3, forming a solid electrolyte layer 5a made of a conductive inorganic material, such as manganese dioxide, or a conductive organic material, such as TCNQ complex salt and conductive polymer, on the dielectric coating film layer 4, and then forming a cathode lead layer 5b made of a conductive carbon, silver or the like, on the solid electrolyte layer 5a (the solid electrolyte layer and the cathode lead layer will be collectively referred to as cathode layer 5 hereinafter).

In addition, an anode lead frame 1 is connected to an anode terminal 31 protruding from the anode body 3, a cathode lead frame 2 is connected to the cathode lead layer 5b, and the capacitor element 30 is covered with a resin sheath 6 of epoxy resin or the like. The anode lead frame 1 and the cathode lead frame 2 have an anode-side terminal surface 10 and a cathode-side terminal surface 20 exposed on the back surface of the resin sheath 6, respectively.

In the case that the anode body 3 is a sintered body of tantalum powder, the anode terminal 31 is constituted by a tantalum wire. The anode lead frame 1 is constituted by a flat plate of an alloy mainly containing copper and can have parts of different thicknesses depending on the design.

The anode lead frame 1 is entirely embedded in the resin sheath 6 and has a flat-plate spaced frame section 13 spaced apart from the anode terminal 31 and a truncated-conical bonding frame section 11 protruding from a center portion of the spaced frame section 13 to the anode terminal 31 in the height direction of the solid electrolytic capacitor. The bonding frame section 11 has a recess 12 which opens in the back surface of the resin sheath 6. An outer surface of the anode terminal 31 is resistance-welded to the surface of the bonding frame section 11.

In other words, the bonding frame section 11 of the anode lead frame 1 has the shape of a bottom-closed tubular vessel placed with the opening facing the back surface of the resin sheath 6 or the shape of a top hat.

Such an anode lead frame 1 can be formed by deep-drawing a flat plate that is to constitute the spaced frame section 13 to form the bonding frame section 11. By using the flat plate made of an alloy mainly containing copper, the deep drawing process is easily achieved.

Second Embodiment

FIGS. 5 to 8 show a solid electrolytic capacitor according to a second embodiment of the present invention. The solid electrolytic capacitor is characterized in that the horizontal cross section of a bonding frame section 11 of an anode lead frame 1 taken perpendicularly to the direction of protrusion thereof has the shape of a laterally elongated ellipse or the shape of an athletic track.

Third Embodiment

Figure 9:
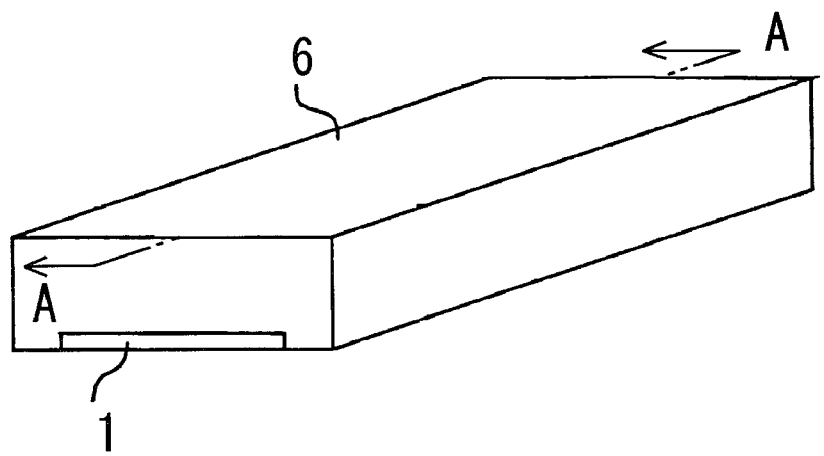
FIG. 9 is a perspective view of a solid electrolytic capacitor according to a third embodiment of the present invention.
Figure 10:
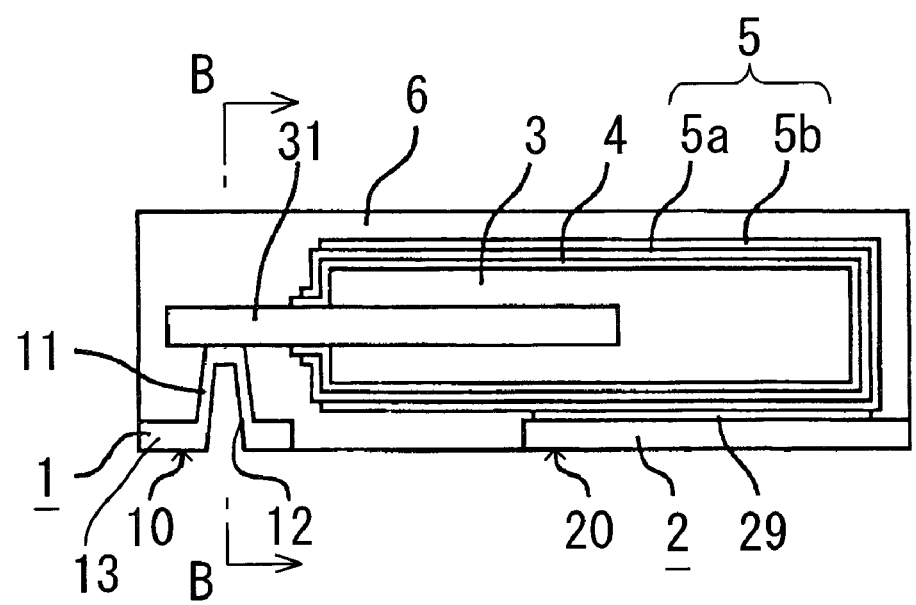
FIG. 10 is a cross-sectional view taken along the line A-A in FIG. 9.
Figure 11:
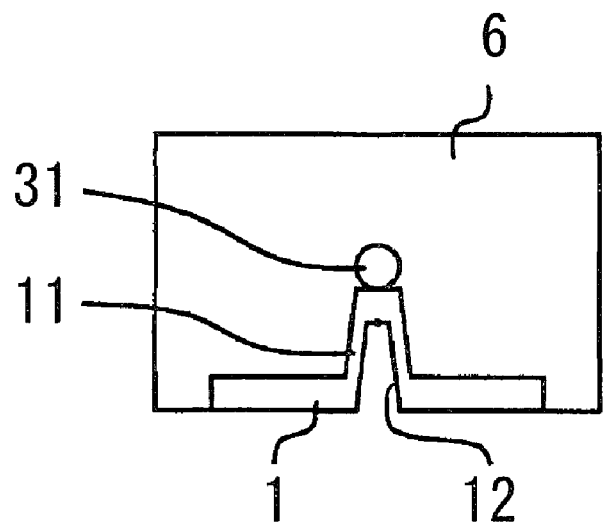
FIG. 11 is a cross-sectional view taken along the line B-B in FIG. 10.
Figure 12:
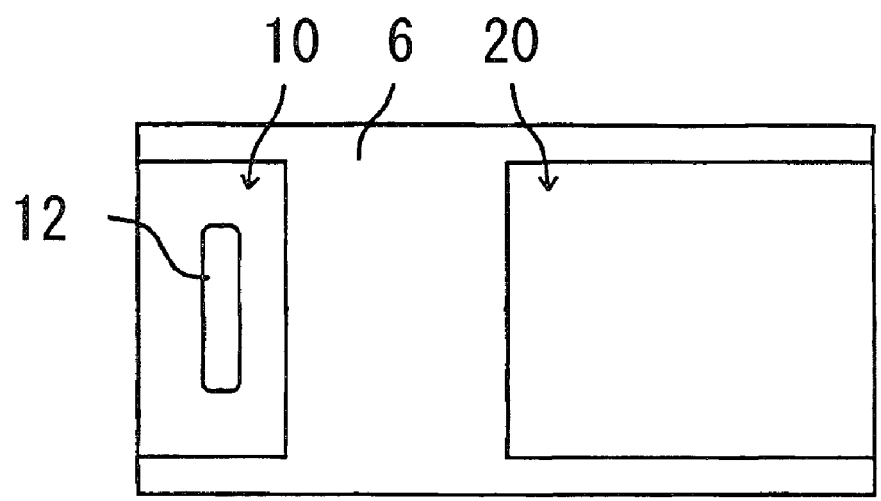
FIG. 12 is a rear view of the solid electrolytic capacitor.
Figure 13:
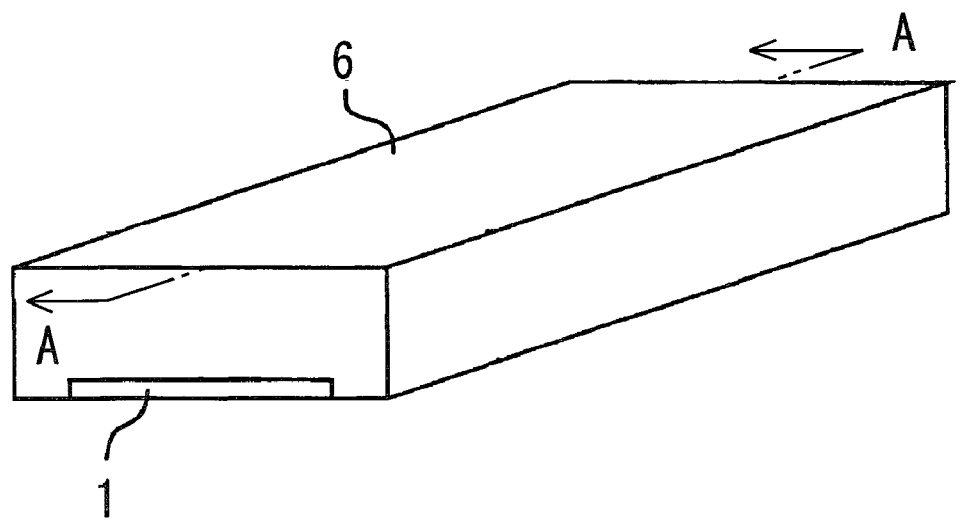
FIG. 13 is a perspective view of a solid electrolytic capacitor according to a fourth embodiment of the present invention.
Figure 14:
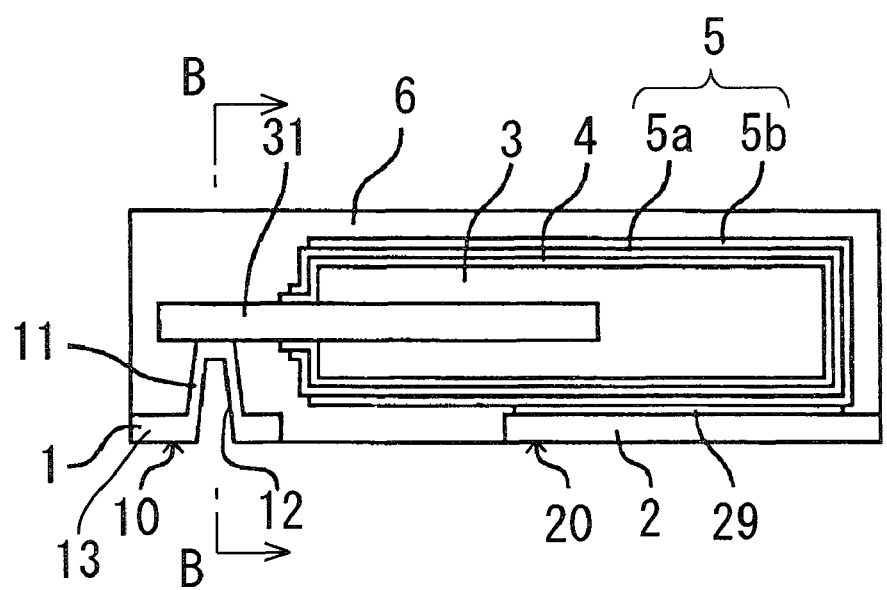
FIG. 14 is a cross-sectional view taken along the line A-A in FIG. 13.
Figure 15:
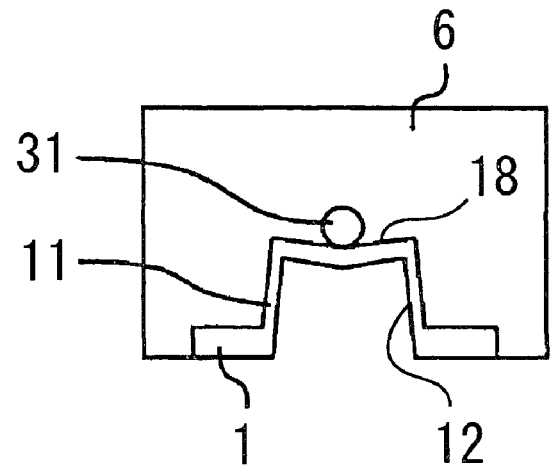
FIG. 15 is a cross-sectional view taken along the line B-B in FIG. 14.
Figure 16:
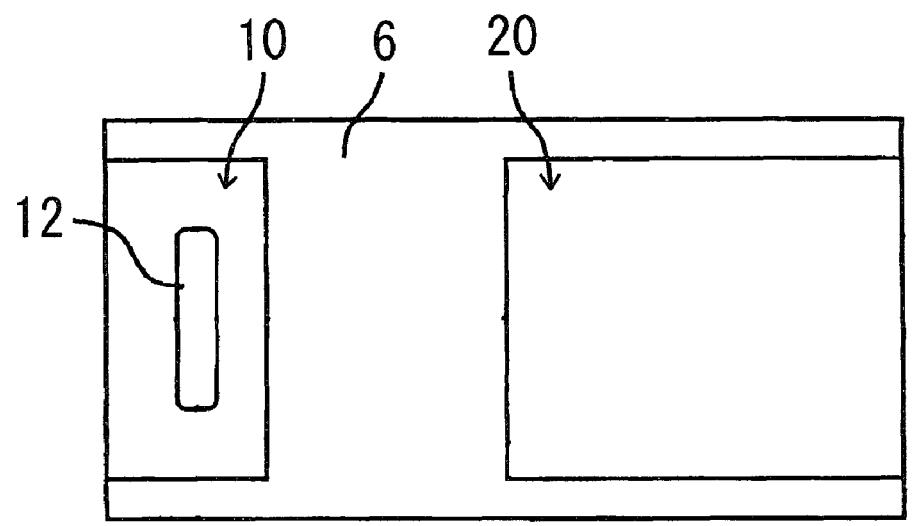
FIG. 16 is a rear view of the solid electrolytic capacitor.
Figure 17:
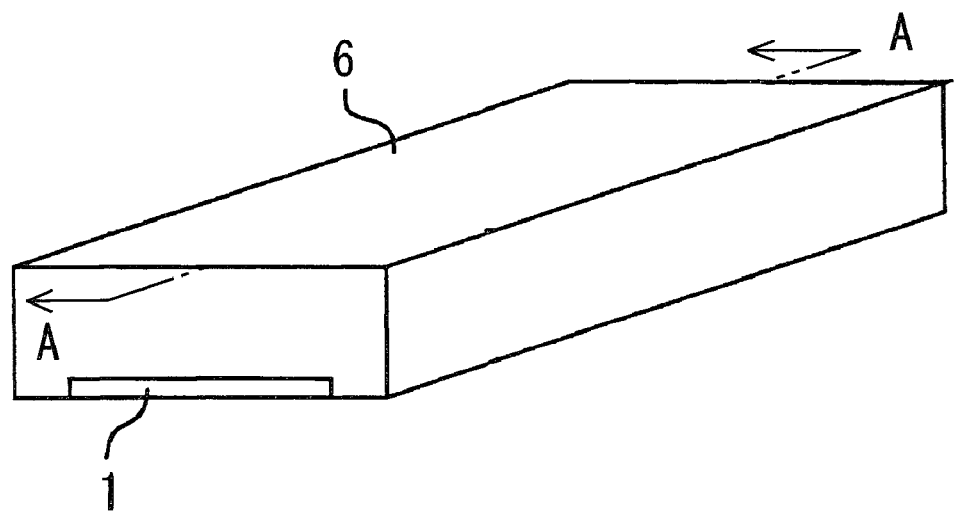
FIG. 17 is a perspective view of a solid electrolytic capacitor according to a fifth embodiment of the present invention.
Figure 18:
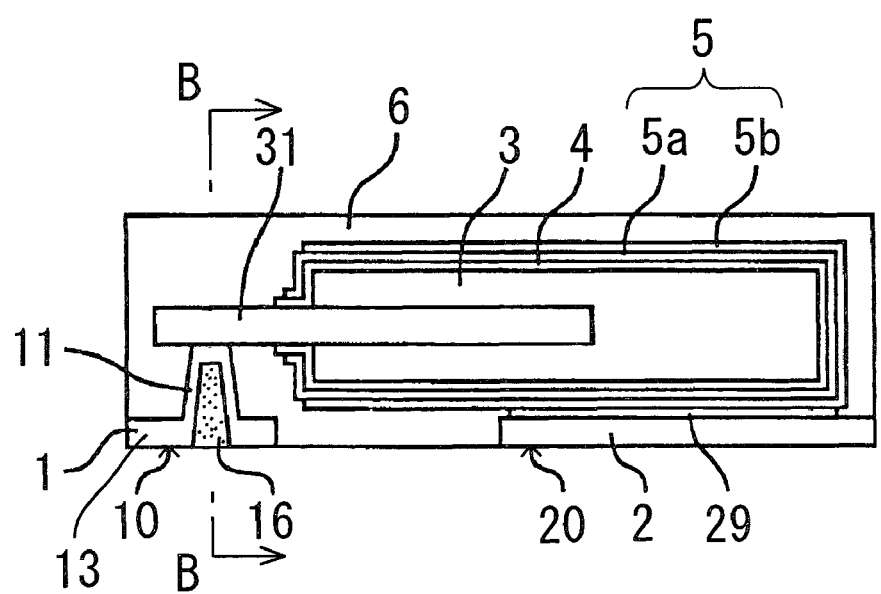
FIG. 18 is a cross-sectional view taken along the line A-A in FIG. 17.
Figure 19:
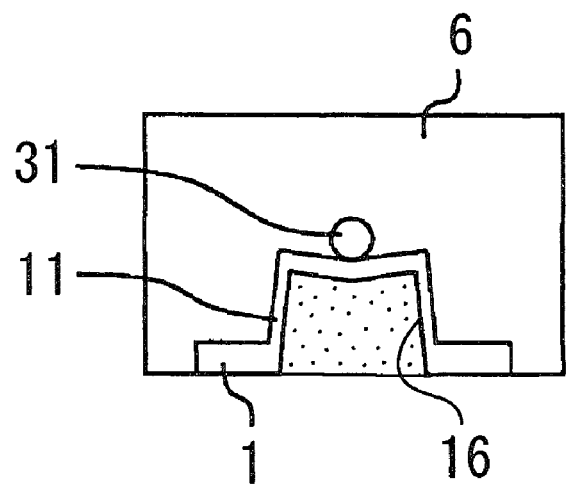
FIG. 19 is a cross-sectional view taken along the line B-B in FIG. 18.
Figure 20:
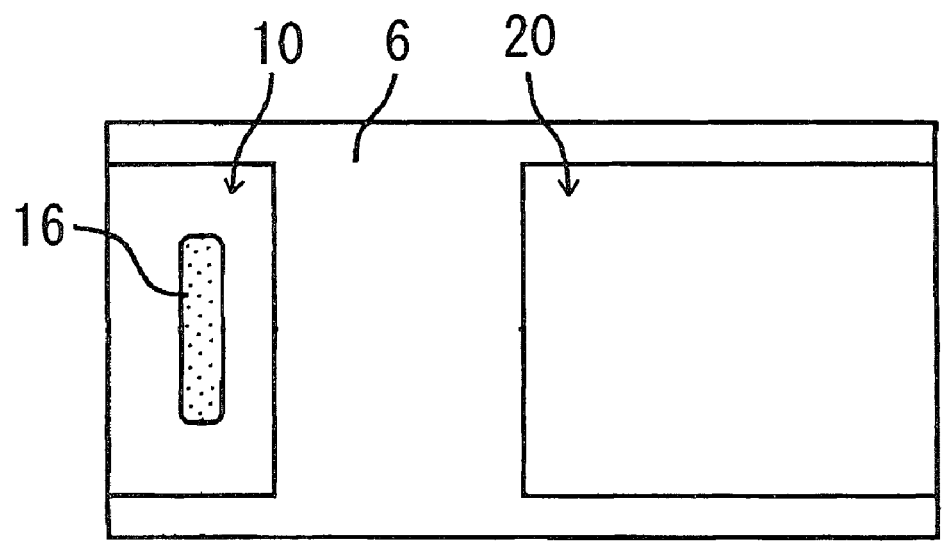
FIG. 20 is a rear view of the solid electrolytic capacitor.
Figure 21:
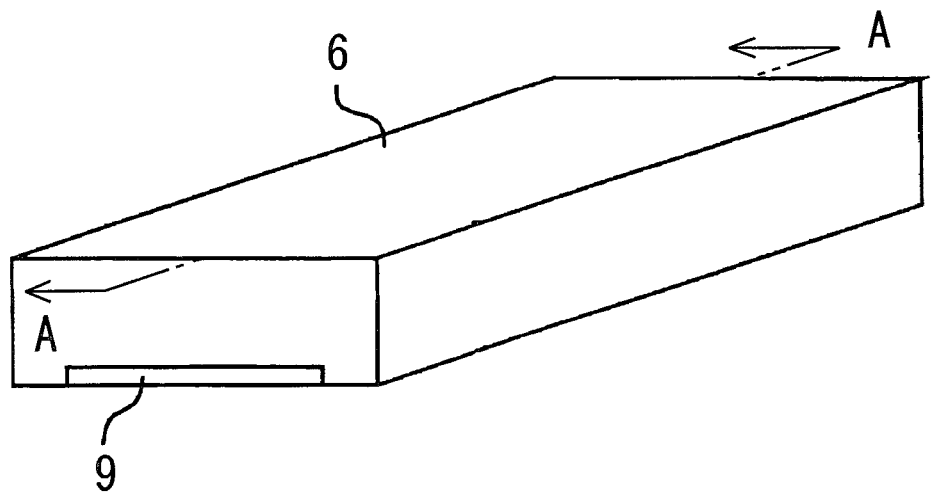
FIG. 21 is a perspective view of a conventional solid electrolytic capacitor.
Figure 22:
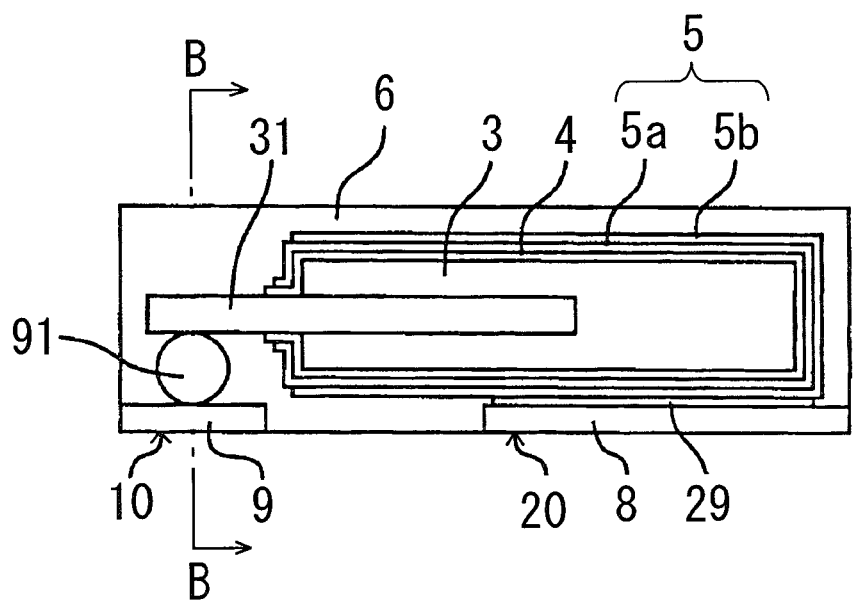
FIG. 22 is a cross-sectional view taken along the line A-A in FIG. 21.
Figure 23:
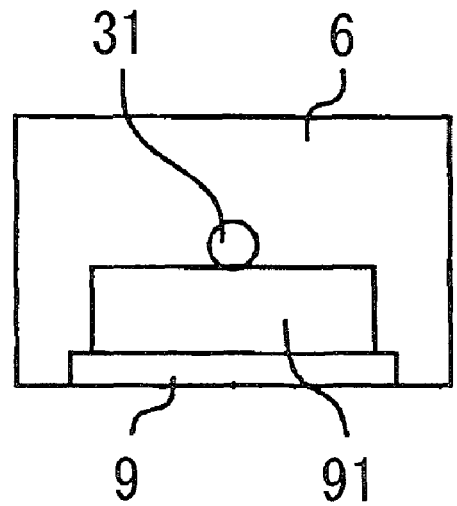
FIG. 23 is a cross-sectional view taken along the line B-B in FIG. 22.
Figure 24:
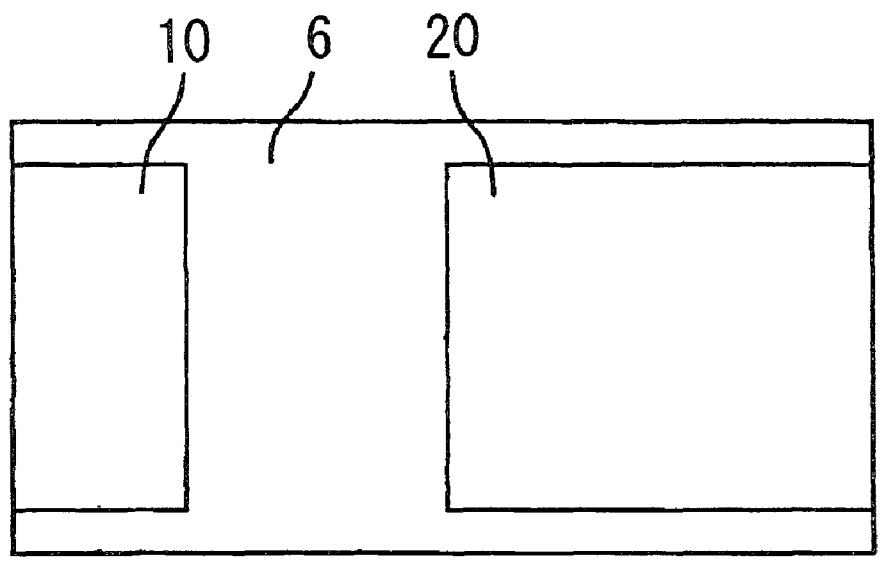
FIG. 24 is a rear view of the solid electrolytic capacitor.

FIGS. 9 to 11 show a solid electrolytic capacitor according to a third embodiment of the present invention. The solid electrolytic capacitor is characterized in that the horizontal cross section of a bonding frame section 11 of an anode lead frame 1 taken perpendicularly to the direction of protrusion thereof has the shape of a laterally elongated rectangle. Corners of the rectangle can be rounded to form arc-shaped corners (R corners) as required.

Fourth Embodiment

FIGS. 13 to 16 show a solid electrolytic capacitor according to a fourth embodiment of the present invention. In the solid electrolytic capacitor, a surface of a bonding frame section 11 of an anode lead frame 1 has a recess 18 that helps positioning of an anode terminal 31 and is formed by recessing a middle portion of the surface with respect to the opposite ends in the direction perpendicular to the longitudinal direction of an anode terminal 31.

With such a configuration, when the anode terminal 31 is placed on the surface of the bonding frame section 11 to traverse the bonding frame section 11, the anode terminal 31 is appropriately positioned, and the posture of the capacitor element is stabilized. In addition, the contact area between the surface of the bonding frame section 11 and the outer surface of the anode terminal 31 increases, and the bonding resistance after welding decreases.

Fifth Embodiment

FIGS. 17 to 20 show a solid electrolytic capacitor according to a fifth embodiment of the present invention. The solid electrolytic capacitor is characterized in that a recess of a bonding frame section 11 of an anode lead frame 1 is filled with a resin 16. The filling of the resin 16 can be achieved by introducing the resin to form a resin sheath into the recess through an opening (not shown) formed in a sidewall of the bonding frame section 11.

Sixth Embodiment

Figure 25:
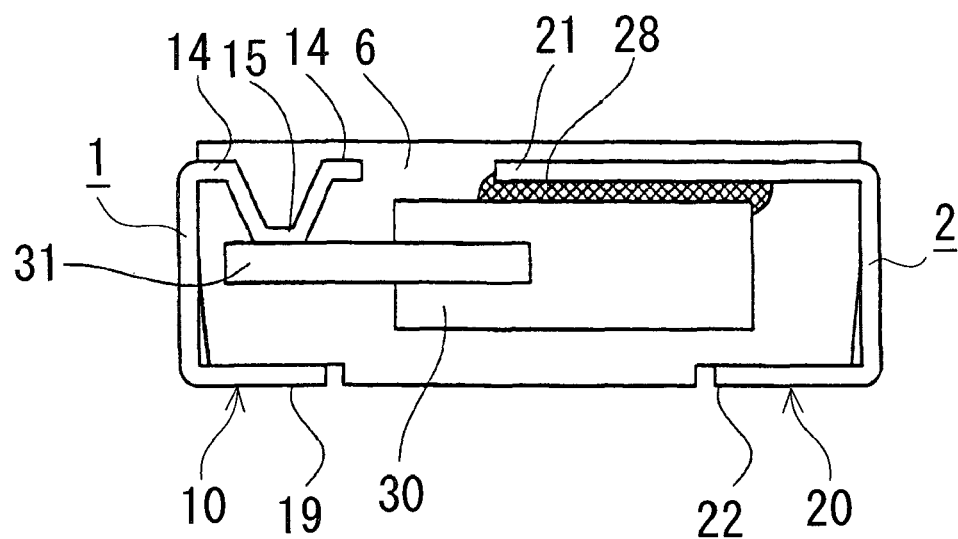
FIG. 25 is a cross-sectional view of a solid electrolytic capacitor according to a sixth embodiment of the present invention.

FIG. 25 shows a solid electrolytic capacitor according to a sixth embodiment of the present invention. In the solid electrolytic capacitor, a capacitor element 30 has the same configuration as the capacitor element 30 shown in FIG. 2 and is formed by forming a dielectric coating film 4 on a surface of an anode body 3, which is a sintered tantalum body having an anode terminal 31 protruding therefrom, by oxidizing the surface of the anode body, forming a solid electrolyte layer 5a made of polypyrrole, which is a conductive polymer, on the dielectric coating film 4, and then forming a cathode lead layer 5b made of carbon and silver on the solid electrolyte layer 5a.

As shown in FIG. 25, an anode lead frame 1 is composed of a part embedded in a resin sheath 6 and a part exposed from the resin sheath 6. The part embedded in the resin sheath 6 includes a flat-plate spaced frame section 14 spaced apart from the anode terminal 31 and a bottom-closed tubular bonding frame section 15 protruding from a center portion of the spaced frame section 14 to the anode terminal 31. The part of the anode lead frame 1 exposed from the resin sheath 6 has the shape of an L letter and extends along the side surface and the back surface of the resin sheath 6. The back surface of a tip section 19 of the part exposed from the resin sheath 6 is flush with the back surface of the resin sheath 6 and forms an anode-side terminal surface 10.

A cathode lead frame 2 is composed of a part embedded in the resin sheath 6 and a part exposed from the resin sheath 6. The part embedded in the resin sheath 6 has the shape of a flat plate, and a base end section 21 thereof is bonded to a cathode lead layer of a capacitor element 30 with a conductive adhesive 28. The part of the cathode lead frame 2 exposed from the resin sheath 6 has the shape of an L letter and extends along the side surface and the back surface of the resin sheath 6. The back surface of a tip section 22 of the part exposed from the resin sheath 6 is flush with the back surface of the resin sheath 6 and forms a cathode-side terminal surface 20.

The spaced frame section 14 of the anode lead frame 1 and the base end section 21 of the cathode lead frame 2 are flush with each other. The anode lead frame 1 and the cathode lead frame 2 are both constituted by a lead frame member made of 42 alloy and having a thickness of 0.1 mm. The anode terminal 31 is constituted by a tantalum wire.

Figure 27A:
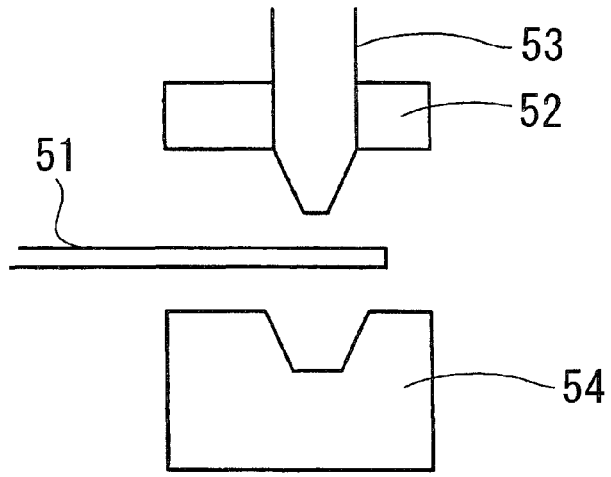
FIG. 27 shows a process of molding of an anode lead frame of a solid electrolytic capacitor according to the present invention.
Figure 27B:
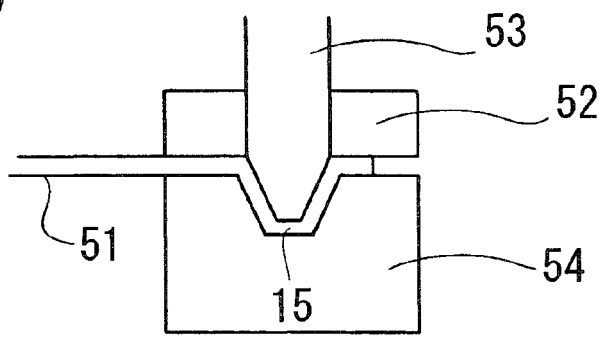

In a process of manufacturing the solid electrolytic capacitor, as shown in FIGS. 27(a) and 27(b), a press working machine having a punch 53 provided with a pressing jig 52 and a die 54 is used to deep-draw a lead frame member 51, which is a material of the anode lead frame and the cathode lead frame, thereby providing the lead frame member 51 with the bonding frame section 15.

Figure 26:
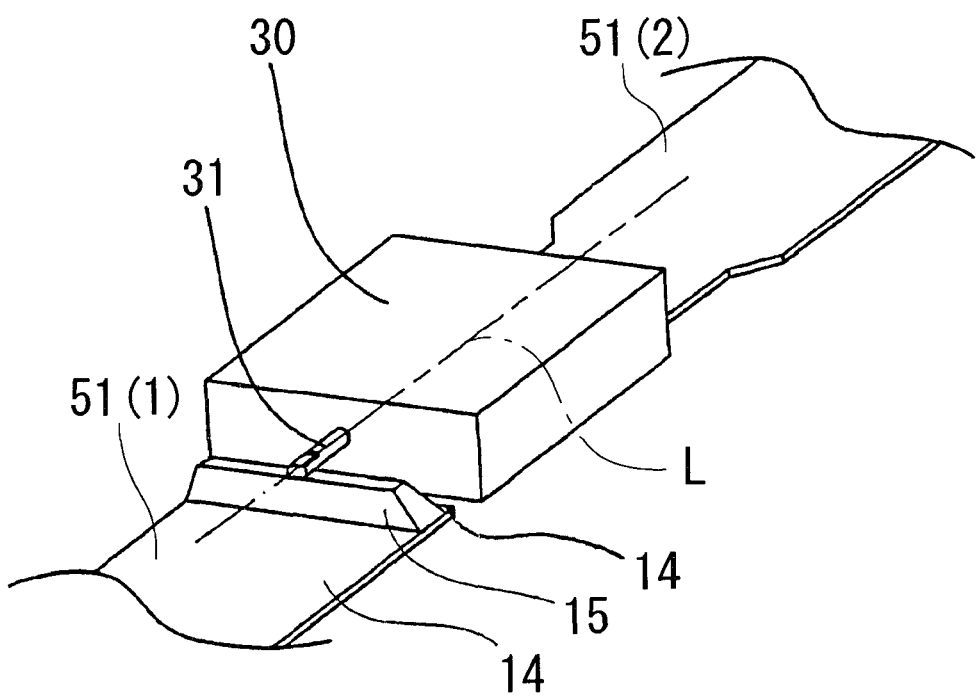
FIG. 26 is a perspective view showing essential parts of the solid electrolytic capacitor.

Then, the capacitor element 30 is mounted on the lead frame member 51 as shown in FIG. 26. The anode terminal 31 of the capacitor element 30 is disposed on the surface of the bonding frame section 15 of the lead frame member 51. A conductive adhesive is applied to a surface of the lead frame member 51 that is to be bonded to the capacitor element 30. Then, the anode terminal 31 and the bonding frame section 15 of the lead frame member 51 are resistance-welded to each other, and the conductive adhesive is heated and cured, thereby bonding the surface of the lead frame member 51 and the cathode lead layer of the capacitor element 30 to each other. The cross section shown in FIG. 25 is taken along the dot-dash line L in FIG. 26.

Figure 28:
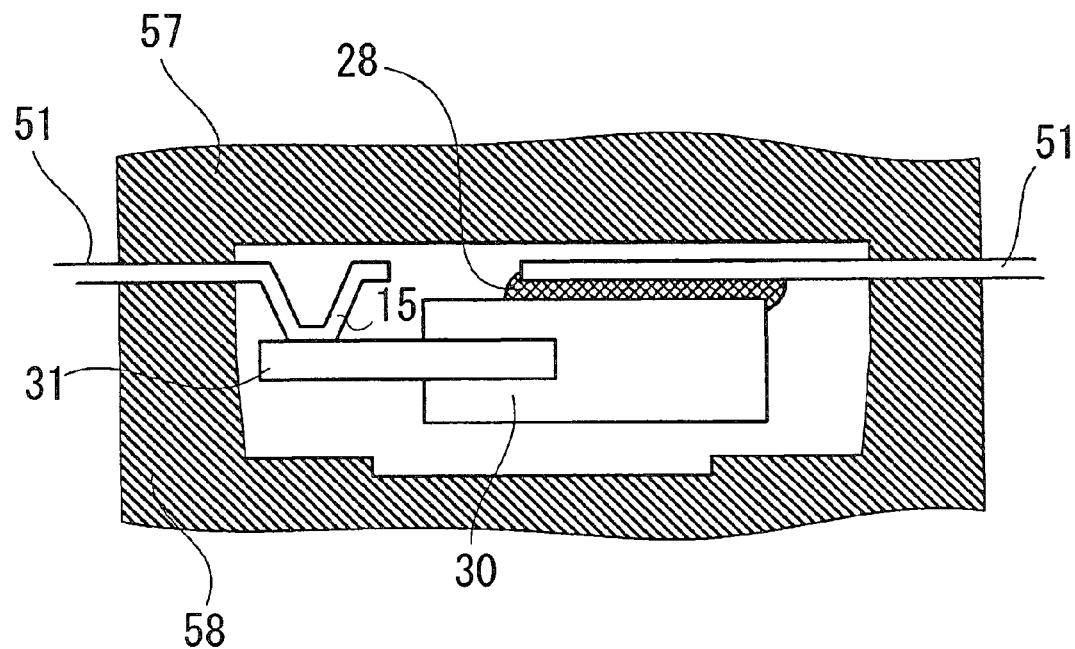
FIG. 28 shows a process of charging of a resin to form a resin sheath of a solid electrolytic capacitor according to the present invention.

Then, as shown in FIG. 28, the lead frame member 51 and the capacitor element 30 are housed in a cavity formed by a pair of dies 57 and 58, the cavity is filled with epoxy resin, and the epoxy resin is cured to form the resin sheath 6.

Then, the lead frame member 51 is cut to form the anode lead frame 1 and the cathode lead frame 2. Then, as shown in FIG. 25, the anode lead frame 1 and the cathode lead frame 2 are bent to conform to the side surface and the back surface of the resin sheath 6 to complete the solid electrolytic capacitor.

Figure 34:
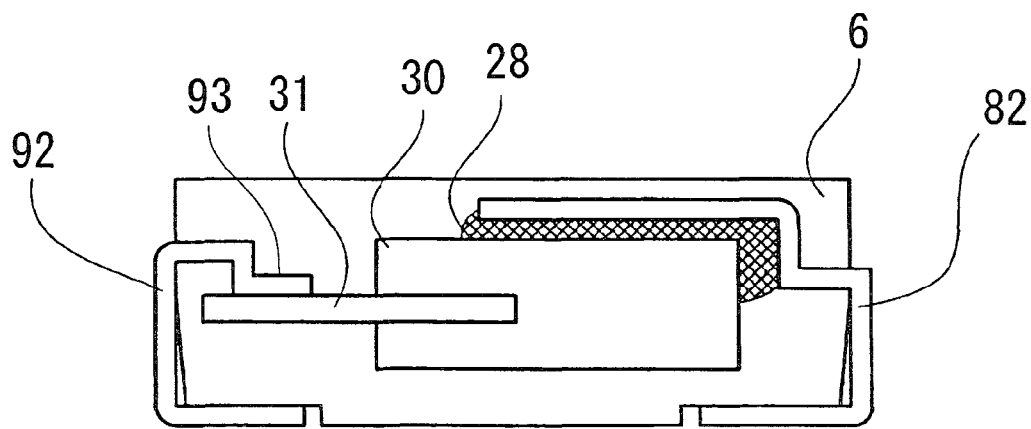
FIG. 34 is a cross-sectional view of a conventional solid electrolytic capacitor.

FIG. 34 shows a conventional solid electrolytic capacitor (Japanese Patent No. 3157722). In the solid electrolytic capacitor, an anode lead frame 92 has a crank-like bent section in a part thereof embedded in a resin sheath 6, and a tip section 93 of the crank-like bend section is resistance-welded to an anode terminal 31. A cathode lead frame 82 also has a bent section in a part thereof embedded in the resin sheath 6.

Figure 35:
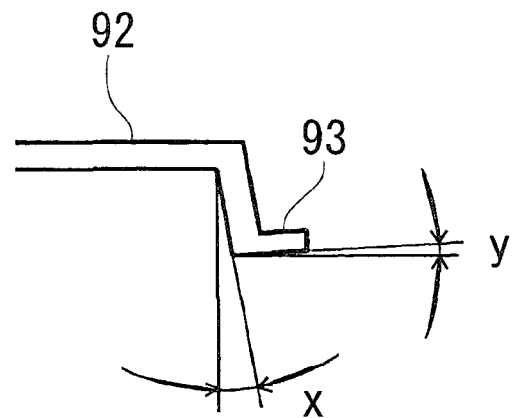
FIG. 35 is a diagram for illustrating a springback of an anode lead frame.
Figure 36:
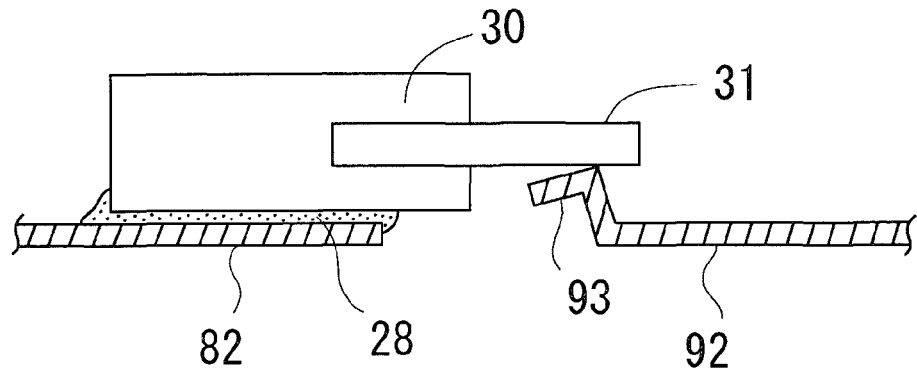
FIG. 36 is a diagram for illustrating a problem with the conventional solid electrolytic capacitor.

As shown in FIG. 35, when the anode lead frame 92 of such a conventional solid electrolytic capacitor is bent, a springback "x" of the anode lead frame 92 occurs, and the tip section 93 is raised by "y" as shown in this drawing. As a result, as shown in FIG. 36, in the step of placing the capacitor element 30 on the cathode lead frame 82 and the anode lead frame 92 and bonding the capacitor element 30 to the cathode lead frame 82 and the anode lead frame 92, the surface of the tip section 93 of the anode lead frame 92 and the outer surface of the anode terminal 31 are not in close contact with each other, and the contact area between the anode lead frame 92 and the anode terminal 31 decreases. Therefore, the conventional solid electrolytic capacitor has problems that the bonding strength decreases, the ESR increases, and the contact resistance increases, for example. In addition, the posture of the capacitor element 30 is not stable, and therefore, the capacitor element 30 can be tilted in the longitudinal direction. If such a tilt occurs, the conductive adhesive 28 is not uniformly distributed between the capacitor element 30 and the cathode lead frame 82, and the thickness of the conductive adhesive 28 varies. This poses a problem that the bonding strength of the conductive adhesive 28 varies, and the reliability decreases.

However, the bonding frame section 15 of the anode lead frame 1 of the solid electrolytic capacitor shown in FIG. 25 has the shape of a bottom-closed tube as shown in FIG. 26 formed by deep drawing shown in FIG. 27, and therefore, the springback that occurs in the conventional solid electrolytic capacitor does not occur.

Therefore, as shown in FIG. 25, the contact area between the bonding frame section 15 of the anode lead frame 1 and the anode terminal 31 is wide, and the posture of the capacitor element 30 is stable. As a result, the high bonding strength is achieved, and the reliability is improved.

In addition, since the spaced frame section 14 of the anode lead frame 1 and the part of the cathode lead frame 2 embedded in the resin sheath 6 are flush with each other, the capacitor element 30 can have a larger size, and therefore, the capacitance can be increased.

Seventh Embodiment

Figure 29:
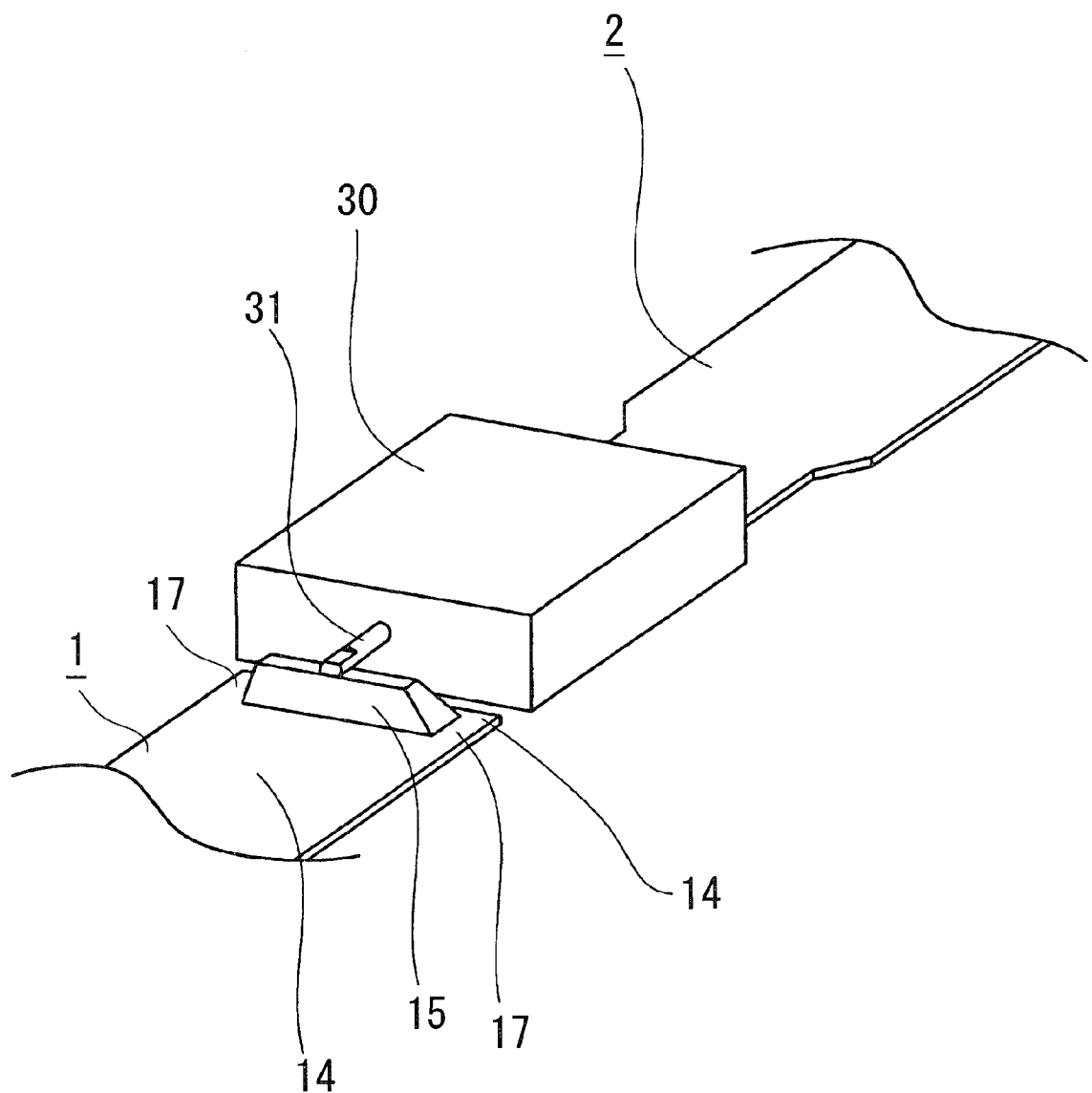
FIG. 29 is a perspective view showing essential parts of a solid electrolytic capacitor according to a seventh embodiment of the present invention.

FIG. 29 shows a solid electrolytic capacitor according to a seventh embodiment of the present invention. As shown in this drawing, an anode lead frame 1 of the solid electrolytic capacitor has flat sections 17, 17 formed at the opposite ends of a bonding frame section 15 in the width direction of the anode lead frame 1 perpendicular to the longitudinal direction thereof and extending in the same plane as a spaced frame section 14.

With such a configuration, the accuracy of the bonding frame section 15 is further improved than in the sixth embodiment, and a capacitor element 30 is maintained in such a posture that the capacitor element 30 is in parallel with the anode lead frame 1 and a cathode lead frame 2, and the bonding strength and the reliability are improved.

Eighth Embodiment

Figure 30:
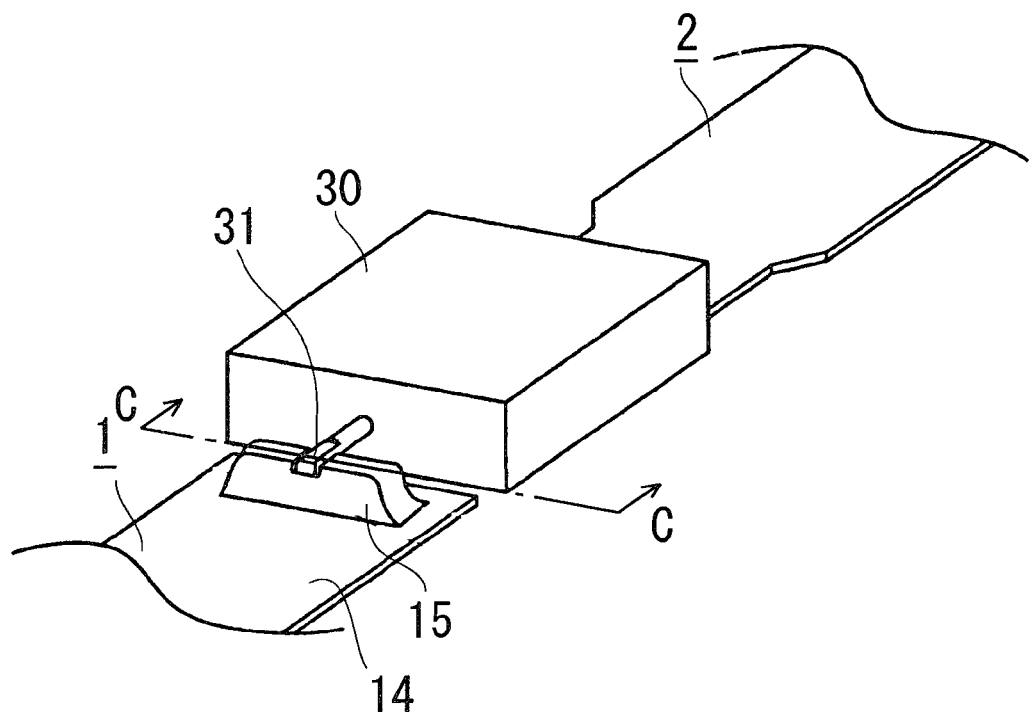
FIG. 30 is a perspective view showing essential parts of a solid electrolytic capacitor according to an eighth embodiment of the present invention.
Figure 31:
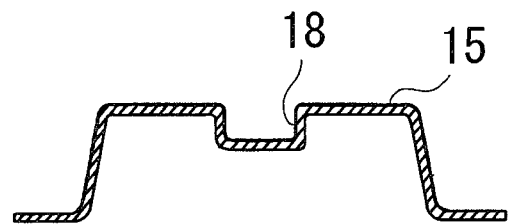
FIG. 31 is a cross-sectional view taken along the line C-C in FIG. 30.

FIGS. 30 and 31 show a solid electrolytic capacitor according to an eighth embodiment of the present invention. The solid electrolytic capacitor has a recess 18 that is formed in a surface of a bonding frame section 15 of an anode lead frame 1, has the shape of an U-shaped groove, and extends along an anode terminal 31.

Figure 37:
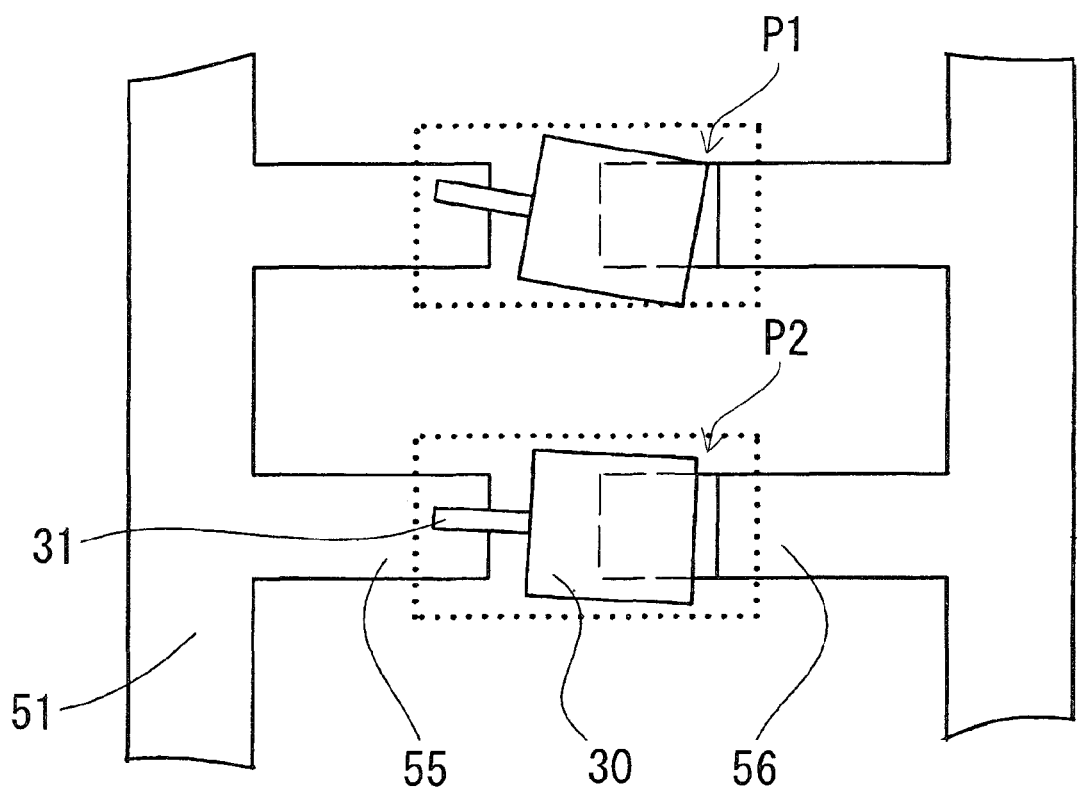
FIG. 37 is a plan view for illustrating misalignment of a capacitor element with respect to a lead frame.

For such a solid electrolytic capacitor, as shown in FIG. 37, when a capacitor element 30 is placed on a lead frame member 51, the capacitor element 30 can be placed in an appropriate posture along an alignment line on an anode lead frame section 55 and a cathode lead frame section 56 of the lead frame member 51 as shown by P2 in the drawing, because the anode terminal 31 is engaged with the recess 18. If the capacitor element 30 is placed in an oblique posture as shown by P1 in the drawing, the thickness of a resin sheath, which is shown by the dotted line in the drawing, is partially reduced, the capacitor element 30 is not adequately covered with the resin sheath, the moisture resistance or the like decreases, and a problem of the reliability arises.

The capacitor element 30 of the solid electrolytic capacitor according to this embodiment can be placed at an appropriate position in an appropriate posture. Therefore, the resin sheath covering the capacitor element 30 has a uniform thickness, and the moisture resistance is improved.

Figure 32A:
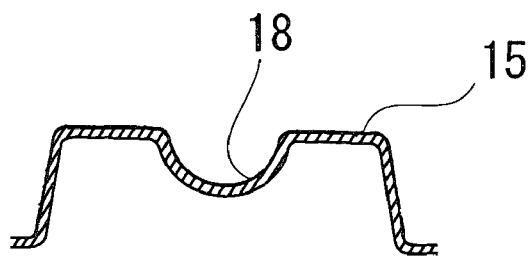
FIG. 32 includes cross-sectional views showing other examples of the configuration of an essential part of a solid electrolytic capacitor according to the present invention.
Figure 32B:
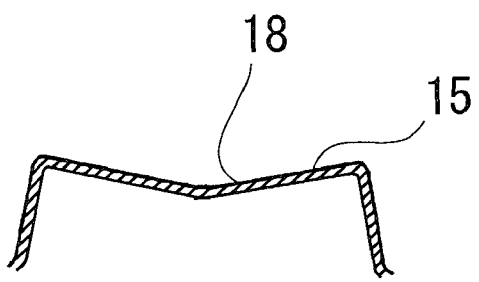
Figure 32C:
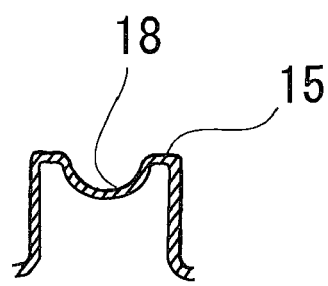

The recess 18 formed in the surface of the bonding frame section 15 of the anode lead frame 1 is not limited to the U-shaped groove but can have any shape that can appropriately determine the position and the posture of the anode terminal 31 such as those shown in FIGS. 32($a$), 32($b$) and 32($c$).

Ninth Embodiment

Figure 33:
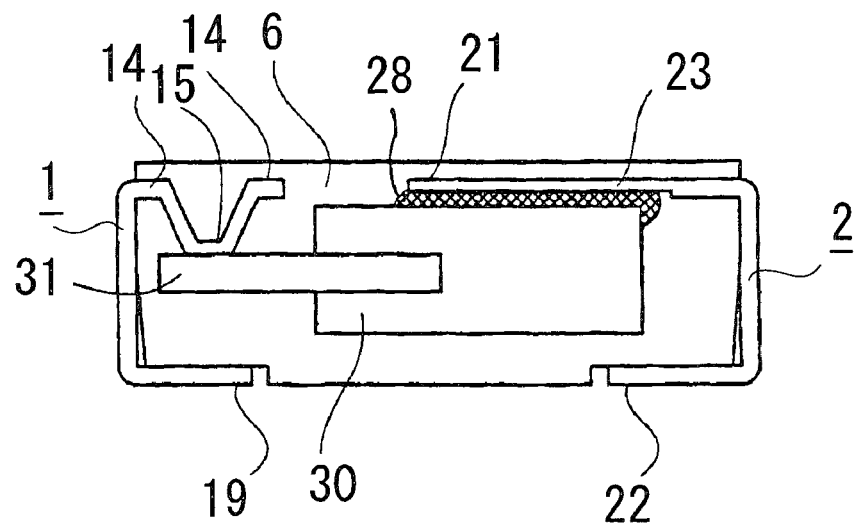
FIG. 33 is a cross-sectional view of a solid electrolytic capacitor according to a ninth embodiment of the present invention.

In a solid electrolytic capacitor according to a ninth embodiment shown in FIG. 33, a portion of a cathode lead frame 2 that is to be bonded to a capacitor element 30 is constituted by a thin part 23. Therefore, the capacitor element 30 can have a larger size, and therefore, the capacitance can be increased.

The material of a sintered body forming an anode body 3 is not limited to tantalum but can be any valve metal. In addition, the material of the lead frame member is not limited to 42 alloy, but can be another currently commercially available material, such as a copper alloy, to achieve the same effect.

As described above, for the solid electrolytic capacitors according to the present invention, the bonding frame section 15 of the anode lead frame 1 is formed by deep-drawing the lead frame member 51, and therefore, the thickness of the bonding frame section 15 is slightly smaller than that of the spaced frame section 14. However, the deep drawing process does not affect the dimensions and the shape of the cathode lead frame 2, and therefore, the contact area between the capacitor element 30 and the cathode lead frame 2 does not decrease, and the ESR also does not decrease.

The invention claimed is:
1. A solid electrolytic capacitor, comprising:
a capacitor element formed by forming a dielectric coating film on a surface of an anode body having an anode terminal protruding therefrom and forming a cathode layer on the dielectric coating film;
a resin sheath that covers the capacitor element;
an anode lead frame having an anode-side terminal surface that is connected to a tip section of the anode terminal of said capacitor element and exposed from said resin sheath; and
a cathode lead frame having a cathode-side terminal surface that is connected to said cathode layer and exposed from said resin sheath,
wherein said anode lead frame includes, in a portion thereof embedded in said resin sheath, a spaced frame section that extends along the anode terminal at a distance from the anode terminal, and a bonding frame section that is bonded to the anode terminal, the bonding frame section protrudes from a part of the spaced frame section to the anode terminal, the part of the spaced frame section being different from the opposite ends thereof in a direction in which the anode terminal extends, and the bonding frame section has a first recess that opens in a surface of the spaced frame section opposite to a surface thereof that faces the anode terminal,
wherein the entire length of said anode lead frame is embedded in said resin sheath, and a back surface of said spaced frame section is exposed on a back surface of the resin sheath to form said anode-side terminal surface.

2. The solid electrolytic capacitor according to claim 1, wherein the entire length of said cathode lead frame is embedded in said resin sheath, and a back surface of said cathode lead frame is exposed on the back surface of the resin sheath to form said cathode-side terminal surface.

3. The solid electrolytic capacitor according to claim 1, wherein the spaced frame section of said anode lead frame extends in the same plane as a section of the cathode lead frame that is connected to said cathode layer.

4. The solid electrolytic capacitor according to claim 1, wherein said anode lead frame has flat sections that are formed at the opposite ends of said bonding frame section in the width direction of the anode lead frame perpendicular to the direction in which the anode terminal extends, and which extend in the same plane as the spaced frame section.

5. The solid electrolytic capacitor according to claim 1, wherein a second recess for positioning of the anode terminal is formed in a surface of the bonding frame section of said anode lead frame by recessing a middle portion of the surface with respect to the opposite ends thereof in the direction perpendicular to the longitudinal direction of the anode terminal.

6. The solid electrolytic capacitor according to claim 1, wherein the first recess of the bonding frame section of said anode lead frame is filled with a synthetic resin to form the resin sheath.

7. The solid electrolytic capacitor according to claim 1, wherein the bonding frame section of said anode lead frame has the shape of a bottom-closed tube that opens in the direction opposite to the direction of protrusion of the bonding frame section.

8. The solid electrolytic capacitor according to claim 1, wherein the bonding frame section of said anode lead frame is formed by deep-drawing a flat plate that is the material of the anode lead frame.

9. A solid electrolytic capacitor, comprising:
a capacitor element formed by forming a dielectric coating film on a surface of an anode body having an anode terminal protruding therefrom and forming a cathode layer on the dielectric coating film;
a resin sheath that covers the capacitor element;
an anode lead frame having an anode-side terminal surface that is connected to a tip section of the anode terminal of said capacitor element and exposed from said resin sheath; and
a cathode lead frame having a cathode-side terminal surface that is connected to said cathode layer and exposed from said resin sheath,
wherein said anode lead frame includes, in a portion thereof embedded in said resin sheath, a spaced frame section that extends along the anode terminal at a distance from the anode terminal, and a bonding frame section that is bonded to the anode terminal, the bonding frame section protrudes from a part of the spaced frame section to the anode terminal, the part of the spaced frame section being different from the opposite ends thereof in a direction in which the anode terminal extends, and the bonding frame section has a first recess that opens in a surface of the spaced frame section opposite to a surface thereof that faces the anode terminal,
wherein said anode lead frame is composed of an embedded frame part embedded in said resin sheath and an exposed frame part extending along a side surface and a back surface of said resin sheath, said spaced frame section and said bonding frame section are formed in the embedded frame part, and said anode-side terminal surface is formed on a tip section of said exposed frame part.

10. The solid electrolytic capacitor according to claim 9, wherein said cathode lead frame is composed of an embedded frame part embedded in said resin sheath and an exposed frame part extending along the side surface and the back surface of said resin sheath, and said cathode-side terminal surface is formed on a tip section of said exposed frame part.

11. The solid electrolytic capacitor according to claim 10, wherein the embedded frame section of said cathode lead frame extends along a straight line in said resin sheath.

12. The solid electrolytic capacitor according to claim 9, wherein the spaced frame section of said anode lead frame extends in the same plane as a section of the cathode lead frame that is connected to said cathode layer.

13. The solid electrolytic capacitor according to claim 9, wherein said anode lead frame has flat sections that are formed at the opposite ends of said bonding frame section in the width direction of the anode lead frame perpendicular to the direction in which the anode terminal extends, and which extend in the same plane as the spaced frame section.

14. The solid electrolytic capacitor according to claim 9, wherein a second recess for positioning of the anode terminal is formed in a surface of the bonding frame section of said anode lead frame by recessing a middle portion of the surface with respect to the opposite ends thereof in the direction perpendicular to the longitudinal direction of the anode terminal.

15. The solid electrolytic capacitor according to claim 9, wherein the first recess of the bonding frame section of said anode lead frame is filled with a synthetic resin to form the resin sheath.

16. The solid electrolytic capacitor according to claim 9, wherein the bonding frame section of said anode lead frame has the shape of a bottom-closed tube that opens in the direction opposite to the direction of protrusion of the bonding frame section.

17. The solid electrolytic capacitor according to claim 9, wherein the bonding frame section of said anode lead frame is formed by deep-drawing a flat plate that is the material of the anode lead frame.

* * * * *